(12) United States Patent
Minatani

(10) Patent No.: US 7,236,337 B2
(45) Date of Patent: Jun. 26, 2007

(54) DRIVE POWER SUPPLY AND FAIL DETERMINATION METHOD

(75) Inventor: Yoshihiko Minatani, Anjo (JP)

(73) Assignee: Aisin AW Co., Ltd. (JP)

( * ) Notice: Subject to any disclaimer, the term of this patent is extended or adjusted under 35 U.S.C. 154(b) by 326 days.

(21) Appl. No.: 10/369,111

(22) Filed: Feb. 20, 2003

(65) Prior Publication Data

US 2003/0174523 A1    Sep. 18, 2003

(30) Foreign Application Priority Data

Feb. 22, 2002    (JP)    ............... 2002-046754

(51) Int. Cl.
*H02H 7/00* (2006.01)

(52) U.S. Cl. .......................... 361/23; 361/18

(58) Field of Classification Search .................. 361/19, 361/21, 23–25, 93.7–93.9, 20, 30, 31, 18, 361/33; 363/55, 56.01, 56.05; 318/617

See application file for complete search history.

(56) References Cited

U.S. PATENT DOCUMENTS

| | | | | |
|---|---|---|---|---|
| 4,780,656 A | * | 10/1988 | Mitchell | 318/798 |
| 4,980,811 A | * | 12/1990 | Suzuji et al. | 363/21.07 |
| 5,055,762 A | * | 10/1991 | Disser et al. | 318/811 |
| 5,694,305 A | * | 12/1997 | King et al. | 363/21.11 |
| 5,929,665 A | * | 7/1999 | Ichikawa et al. | 327/109 |
| 6,016,260 A | * | 1/2000 | Heeringa | 363/21.18 |
| 6,304,473 B1 | * | 10/2001 | Telefus et al. | 363/97 |

FOREIGN PATENT DOCUMENTS

JP    2000-233090    8/2000

* cited by examiner

*Primary Examiner*—Stephen W. Jackson
*Assistant Examiner*—Danny Nguyen
(74) *Attorney, Agent, or Firm*—Bacon & Thomas, PLLC

(57) ABSTRACT

A drive power supply for generating inverter drive voltages has a switching control circuit that switches a switching element on a primary side of a transformer to generate drive voltages on the secondary side in connection with the switching of switching elements of the inverter. A feedback circuit generates a feedback voltage corresponding to the drive voltages and supplies the feedback voltage to the switching control circuit to control the drive voltages. An abnormality detecting portion changes the feedback voltage when the voltage of a predetermined terminal fluctuates. Thus when an IG short involving the predetermined terminal occurs, the drive voltages are changed by the switching control circuit sensing the change in the feedback voltage. Since any change in the drive voltages is detected to reliably determine an abnormality, an IG short is detected as an abnormality even though the abnormality has been generated in the drive power supply independent of any prior change in the actual drive voltages.

8 Claims, 4 Drawing Sheets

DRIVE POWER SUPPLY AND FAIL DETERMINATION METHOD

CROSS-REFERENCE TO RELATED APPLICATIONS

The disclosure of Japanese Patent Application No. 2002-046754 filed on Feb. 22, 2002, including the specification, drawings and abstract, is incorporated herein by reference in its entirety.

BACKGROUND OF THE INVENTION

Conventionally, an electrically driven vehicle, for example, an electric automobile, is equipped with a drive train wherein rotation generated by an electric drive motor is transmitted to a drive wheel so as to propel the electric automobile. In a hybrid vehicle, an engine and a generator are provided in addition to the drive motor in the drive train so that the engine drives the generator to generate electric power which is stored in a battery.

Typically, the electric drive motor has a rotor provided with paired magnetic poles, and has a stator surrounding the rotor and provided with phase U, v and W coils. Supplying U, V and W phase currents to the coils generates torque on the rotor, i.e. drive motor torque, which propels the vehicle.

For generating the U, V and W phase currents, an inverter is connected to the battery for receiving direct current from the battery. Pulse width modulation signals generated by a motor drive control operate an inverter drive circuit which turns on and off respective transistors in a plurality of transistors in the inverter in a predetermined pattern to generate each of the U, V and W phase currents. A drive power supply is provided in order to generate the necessary voltage for turning each transistor on and off. This drive power supply is connected to the inverter drive circuit which is controlled by the pulse width modulation signals from the motor drive control for supplying the voltages operating the respective transistors generating the U, V and W voltages.

FIG. 2 is a drawing illustrating the basic components of an electric motor drive circuit including a drive power supply 21, an IPM (intelligent power module) 22 containing an inverter and an inverter drive circuit, and a motor drive control 23 for driving the electric motor. Connectors C1 and C2 are provided in the drive power supply 21; connectors C3 and C4 are provided in the IPM 22; and connectors C5 and C6 are provided in the motor drive motor control 23.

The connector C1 has an output terminal and a ground terminal for each phase for supplying the necessary voltage needed to operate each transistor in the inverter. The connector C2 is equipped with an input terminal for receiving an ignition (IG) voltage supplied from the motor drive control 23, an output terminal in order to output a Ready signal, and a ground terminal for grounding the drive power supply 21.

The connector C3 is equipped with input terminals (not shown) for receiving the voltages supplied from the drive power supply 21. The connector C4 is equipped with input terminals (not shown) in order to receive the pulse width modulation signals for switching the respective inverter transistors and, an output terminal (not shown) in order to output a Ready signal, as well as a ground terminal (not shown) for grounding the IPM 22.

The connector C5 is equipped with an input terminal (not shown) for receiving the Ready signal sent from the drive power supply 21. The connector C6 is equipped with an input terminal (not shown) for receiving the Ready signal sent from the IMP 22, output terminals (not shown) in order to output the pulse width modulation signals, and a ground terminal (not shown) for grounding the motor drive control 23.

The Ready signal is a signal indicating that the electric motor drive circuit including the drive power supply 21 and the IPM 22 are operating normally, and that the voltages from the drive power supply 21 necessary for driving the inverter are not excessively high or low. By simply referring to the logic (level) of the Ready signal, it is possible to judge whether the drive power supply 21, the IPM 22, and the like are operating normally, i.e. whether abnormalities have been generated in the drive power supply 21, the IPM 22, and other motor drive circuit portion. A high level of the Ready signal indicates normal operation and a low level such as caused by a ground short indicates an abnormality in the drive power supply 21, the IPM 22, or other portion of the motor drive circuit.

However, when the input terminal for receiving the ignition voltage and the output terminal for outputting the Ready signal provided in the connector C2 short circuit (hereinafter referred to as an "IG short") in the conventional drive power supply apparatus, if an abnormality is generated in the drive power supply 21, it becomes impossible to detect the abnormality because the Ready signal is held at a high level by the ignition voltage.

Hence, in order to determine whether an IG short has occurred, it becomes necessary to separately provide an abnormality detecting circuit such as an IG short detecting circuit, therefore not only will the drive power supply apparatus become more complicated, but the cost of the drive power supply apparatus will increase as well.

BRIEF SUMMARY OF THE INVENTION

It is an object of the present invention to solve the problems of the aforementioned conventional drive power supply apparatus, and provide a drive power supply and fail determination method that allows for lowered costs and a definite determination of abnormalities generated in the drive power supply.

To this end, the drive power supply according to a first aspect of the present invention includes a switching control circuit that switches a switching element driving a primary side of a transformer; a drive voltage generating portion on a secondary side of a transformer for generating a predetermined drive voltage accompanying the switching of the switching element; a feedback circuit that generates a feedback voltage accompanying the generation of drive voltage in the drive voltage generating portion and supplies the feedback voltage to the switching control circuit; and an abnormality detecting portion that changes the feedback voltage when the voltage of a predetermined terminal fluctuates.

In this case, for example, the feedback voltage and the drive voltage are changed when an abnormality is occurs on a predetermined terminal and the voltage fluctuates, similar to when an IG short occurs, therefore, it is impossible to reliably determine whether an abnormality has occurred in the drive power supply independent of the voltage of the terminal. Also, since it is not necessary to separately provide an IG short detecting circuit, not only can the drive power supply apparatus be simplified, but the cost of the drive power supply apparatus can be reduced as well.

The drive power supply apparatus according to the first aspect of the present invention may be further structured such that the aforementioned predetermined terminal is an output terminal that outputs a normal operation signal which indicates the drive power supply is operating normally.

The drive power supply apparatus according to the first aspect of the present invention may be further structured such that the abnormality detecting portion increases the feedback voltage above its normal operating level when a signal short generates a high voltage level signal.

Furthermore, the drive power supply apparatus according to the first aspect of the present invention may include a fail signal generating portion that generates a fail signal when the drive voltage changes in connection with the change in the feedback voltage.

The drive power supply apparatus according to the first aspect of the present invention may be further structured such that the drive voltage is supplied to the IPM for driving the electric machine.

The drive power supply apparatus according to the first aspect of the present invention may be further structured such that the drive voltage is supplied to the IPM for driving the electric machine and a fail signal generating portion is provided in the IPM.

The drive power supply apparatus according to the first aspect of the present invention may further include a power voltage supply stop processing mechanism that stops the supply of power voltage to the IPM for driving the electric machine.

A fail determination method according to a second aspect of the present invention includes the steps of switching a switching element on a primary side of the transformer, generating a predetermined drive voltage accompanying the switching of the switching element on a secondary side of the transformer, generating feedback voltage accompanying the generation of the drive voltage, and supplying the feedback voltage to a switching control circuit, and subsequently changing the feedback voltage when the voltage of a predetermined terminal fluctuates.

DETAILED DESCRIPTION OF THE INVENTION

Figure 3:
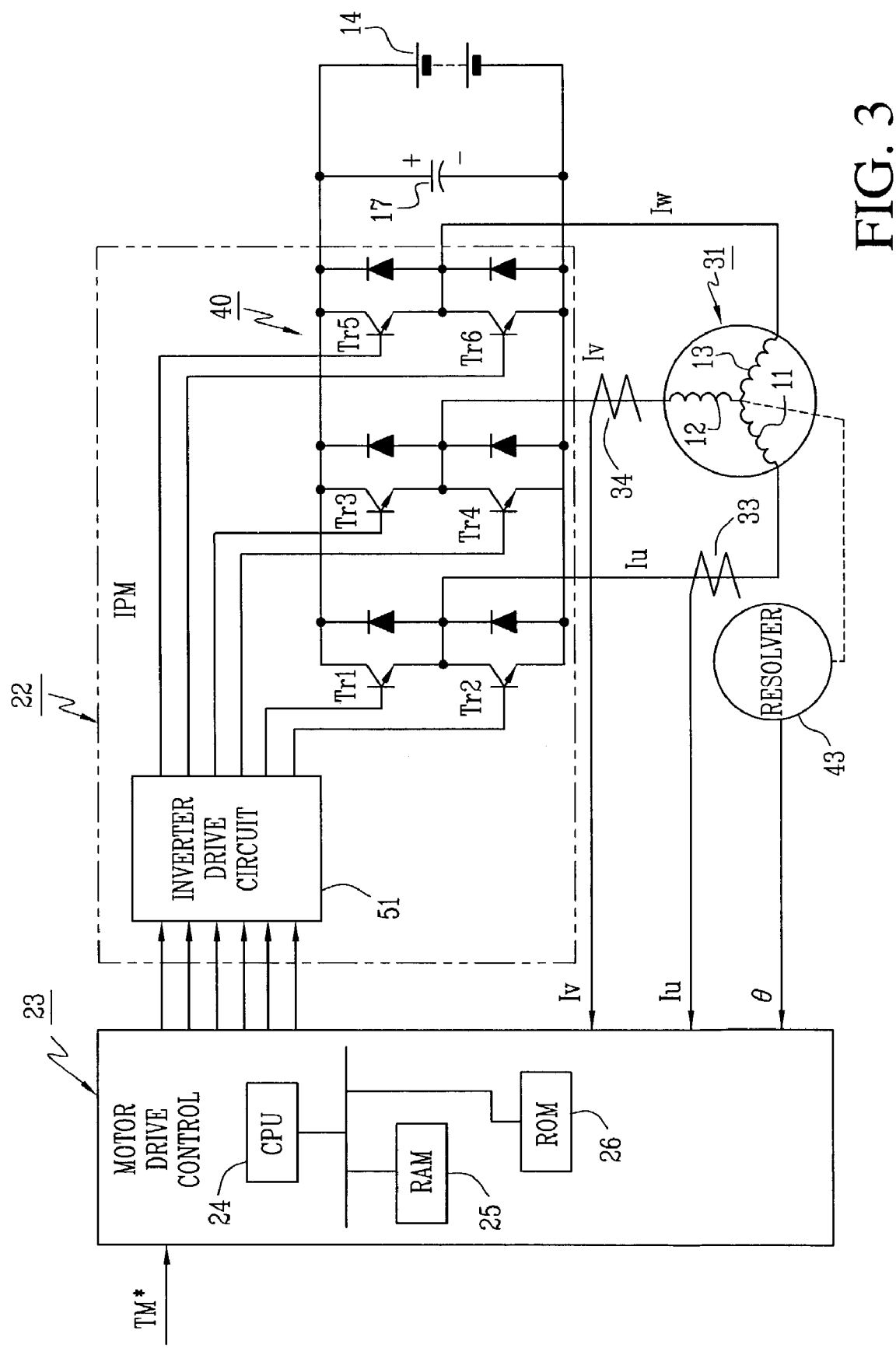
FIG. 3 is a control circuit diagram of an electric vehicle drive control device according to the embodiment of the present invention.

One embodiment of the present invention is described in detail with reference to the accompanying FIGS. 1–5. In FIG. 3 which is a control circuit diagram of an electric vehicle drive control device according to an embodiment of the present invention, reference numeral 22 denotes an IPM and reference numeral 23 denotes a motor drive control that includes a computer controlled by various programs, data and the like. Reference numeral 31 denotes an electric drive motor such as an AC brushless drive motor. The IPM 22 is provided with an inverter 40 and an inverter drive circuit 51.

The drive motor 31 is equipped with a rotor (not shown) and a stator (represented by coils 11, 12 and 13) surrounding the rotor.

The rotor is equipped with a rotor core fixed to a shaft (not shown) of the drive motor 31 and has permanent magnets (not shown) mounted in a plurality of places spaced peripherally around the rotor core. For example, permanent magnets are mounted in twelve equally spaced positions on the circumference of the rotor core with N and S poles alternately facing toward the rotor peripheral surface to form six pairs of magnetic poles. In addition, the stator is equipped with a stator core (not shown), and stator coils 11 to 13 of the phases U, V and W respectively, which are wound around the outside of the stator core. Teeth (not shown) protrude in an inward radial direction at a plurality of evenly spaced places in the circumference of the stator core forming stator magnetic poles which react with the permanent magnets of the rotor to provide rotary torque to the rotor.

In order to drive the drive motor 31 and run an electric vehicle such as an electric automobile or hybrid vehicle, a battery 14 forms a direct current power source. The inverter 40 is supplied direct current from the battery 14 and converts the direct current into alternating currents Iu, Iv and Iw of the phases U, V and W. The inverter drive circuit 51 that receives the pulse width modulation signals from the motor drive control 23 and generates the appropriate operating signals for the transistors of the inverter 40 to generate the currents Iu, Iv and Iw supplied to the stator coils 11 to 13 respectively.

For this purpose, the inverter 40 is provided with transistors Tr1 to Tr6 which are six switching elements. The pulse modulation signals from the inverter drive circuit 51 switch the transistors Tr1 to Tr6 on and off to generate the currents Iu, Iv and Iw. A smoothing capacitor 17 is provided between the IPM 22 and the battery 14, and charge corresponding to capacitance is stored in the capacitor 17.

In addition, a resolver 43 connected to the rotor shaft of the drive motor 31 detects a magnetic pole position θ. Alternatively, a Hall element or other magnetic pole position detecting device (not shown) can also be used in place of the resolver 43. A Hall element position detecting device generates a position detecting signal at each predetermined rotor pole angle in connection with the rotation of the rotor and determines the magnetic pole position θ based upon the combination of signal levels of the position detecting signals.

Moreover, since the stator coils 11 to 13 are star-connected, when the values of two of the various current phases are determined, the remaining value of the last current phase is also determined. Accordingly, in order to control the currents Iu, Iv and Iw, for example, current sensors 33 and 34 which are current detecting mechanisms that detect the currents Iu and Iv of the phases U and V are provided on lead wires of the stator coils 11 and 12. The current sensors 33 and 34 send the detected currents Iu and Iv to the motor drive control 23.

Also, the motor drive control 23 includes a CPU 24, a RAM 25 and a ROM 26 along with other conventional circuitry. The CPU 24, from an algorithm in RAM or ROM, calculates a drive motor rotational speed NM based upon the magnetic pole position θ. In addition, the CPU calculates a vehicle speed V corresponding to the drive motor rotational speed NM, and sends the detected vehicle speed V to a vehicle control device (not shown) that controls the entire electric vehicle.

A command value generating portion of the vehicle control device calculates the necessary vehicle required torque for running the electric vehicle based upon the vehicle speed V and an acceleration angle α detected by an accelerator sensor (not shown), generates a drive motor target torque TM* that represents a target value of a drive motor torque TM parallelized to the vehicle required torque, and sends the drive motor target torque TM* to the motor drive control 23.

A drive motor control algorithm (not shown) operates the CPU 24 to read the drive motor target torque TM*, and refer to a current command value map (not shown) stored in the ROM 26 to determine a d axis current command value ids representing a d axis component and a q axis current command value ids representing a q axis component of the vectorized current command value is. In addition, CPU 24 reads the currents Iu and Iv and calculates voltage command values Vu*, Vv*, and Vw* of the phases U, V and W based upon the d axis current command value ids, the q axis current command value iqs, as well as the currents Iu, and Iv and then generates pulse width modulation signals SU, SV, and SW of the phases U, V and W, which have a predetermined pulse width based upon the voltage command values Vu*, Vv*, and Vw*. Dead time compensation processing of the pulse width modulation signals SU, SV, and SW by the CPU generates pulse width modulation signals SU, SV, SW, SX, SY, and SZ, and sends the pulse width modulation signals SU, SV, SW, SX, SY, and SZ to the IPM 22. The pulse width modulation signals SU, SV, and SW are generated to operate with the respective transistors Tr1, Tr3, and Tr5, and the pulse width modulation signals SX, SY, and SZ are generated to operate with the respective transistors Tr2, Tr4, and Tr6.

The drive circuit 51 respectively generates six drive signals for driving the transistors Tr1 to Tr6 when the pulse width modulation signals SU, SV, SW, SX, SY, and SZ are sent, and sends the drive signals to the inverter 40. The inverter 40 turns on the transistors Tr1 to Tr6 and generates currents Iu, Iv and Iw only while the drive signals are on, and supplies the currents Iu, Iv and Iw to each of the stator coils 11 to 13. Thus, it is possible to run the electric vehicle by driving the drive motor 31.

The motor drive control 23 is designed so that feedback control is performed by a vector control calculation based on a d-q model that respectively employs a d axis in the direction of the magnetic pole pairs of the rotor and a q axis that is perpendicular to the d axis.

For that purpose, within the CPU 24, 3 phase/2 phase conversion is executed based upon the currents Iu and Iv detected by the current sensors 33 and 34, and the magnetic pole position θ detected by the resolver 34, thereby converting the currents Iu and Iv into the d axis current id and the q axis current iq. The d axis current deviation Δid between the d axis current id and the d axis current command value ids, and the q axis current deviation Δiq between the q axis current iq and the d axis current command value iqs are subsequently calculated. A d axis voltage command value Vd* and a q axis voltage command value Vq* which are the inverter output for the 2 axes are generated such that the d axis current deviation Δid and the q axis current deviation Δiq become zero (0).

2 phase/3 phase conversion based upon the d axis voltage command value Vd*, the q axis voltage command value Vq*, and the magnetic pole position θ is subsequently executed, thereby converting the d axis voltage command value Vd* and the q axis voltage command value Vq* into phase U, V and W voltage command values Vu*, Vv*, and Vw*. The pulse width modulation signals SU, SV, SW, SX, SY, and SZ of each phase are generated based upon the voltage command values Vu*, Vv*, and Vw*, and the voltage of the battery 14, i.e. battery voltage VB, which is detected by a direct current voltage detecting unit (not shown).

The drive signals of the transistors Tr1, Tr3, and Tr5 are pulsed at +15 V when the respective transistors Tr1, Tr3, and Tr5 are turned on to produce a positive half cycle of the respective phase. During the positive half cycles, the transistors Tr2, Tr4, and Tr6 are maintained off by setting the drive signals of the transistors Tr2, Tr4, and Tr6 at 0 V. Likewise, the drive signals of the transistors Tr2, Tr4, and Tr6 are pulsed at +15 V during respective negative half cycles of the phases. During the negative half cycles, the transistors Tr1, Tr3, and Tr5 are maintained off by setting the drive signals of the transistors Tr1, Tr3, and Tr5 at 0 V.

Hence, a drive power supply 21 (see FIG. 2) is provided in order to render each drive signal to either +15 V or 0 V. In the drive power supply 21, a +15 V voltage is generated for each of the phases U, V, W, X, Y, and Z and output to the IPM 22. In order to turn off the transistors Tr1 to Tr6, the +15 V voltage of the phases U, V, W, X, Y, and Z are converted to 0 V within the IPM 22.

The inverter 40 and the drive circuit 51 are provided within the IPM 22; therefore the distance between the drive circuit 51 and each of the transistors Tr1 to Tr6 is short. Accordingly, by simply rendering each drive signal to 0 V, it is possible to reliably turn off each of the transistors Tr1 to Tr6. On the contrary, if the IPM 22 is not used and the inverter and the drive circuit are independently provided and wired, the distance between the drive circuit and each of the transistors becomes longer. Hence, to reliably turn off each of the transistors Tr1 to Tr6 when the IPM 22 is not used, each drive signal to turn off the corresponding transistor is rendered −15 V.

In addition, the drive power supply apparatus is structured from the drive power supply 21, the IPM 22, and the motor drive control 23.

Next, the drive power supply 21 will be described.

Figure 1:
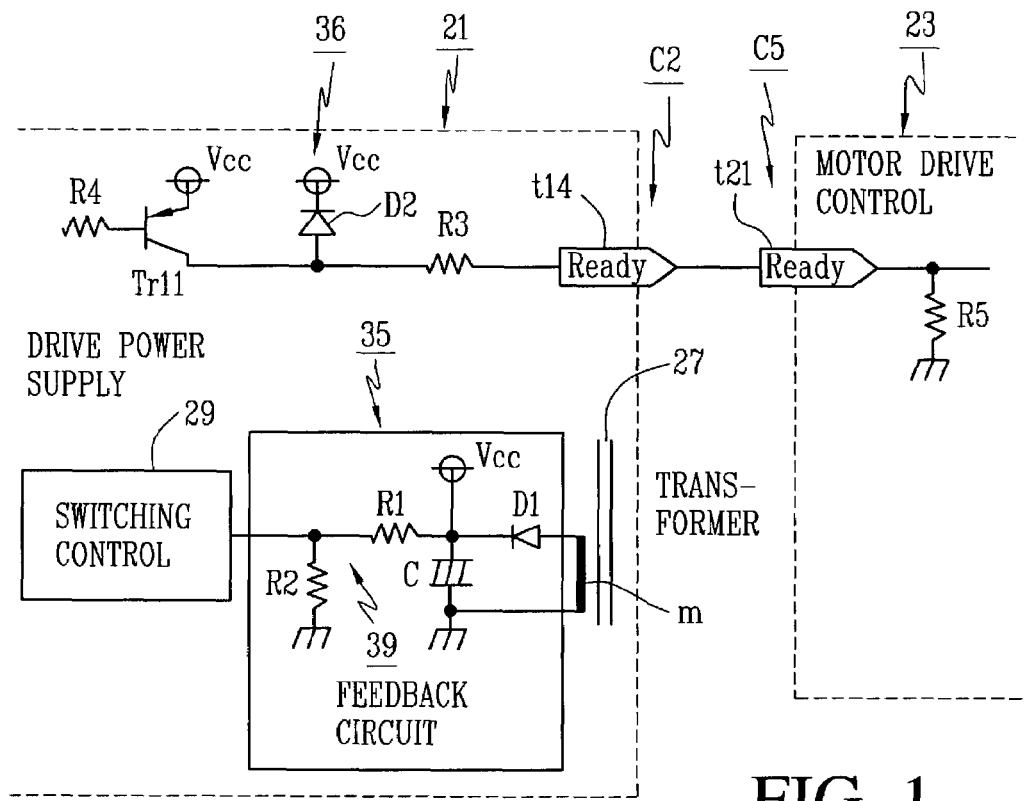
FIG. 1 is a circuit diagram illustrating the main portion of a drive power supply in accordance with one embodiment of the invention.
Figure 2:
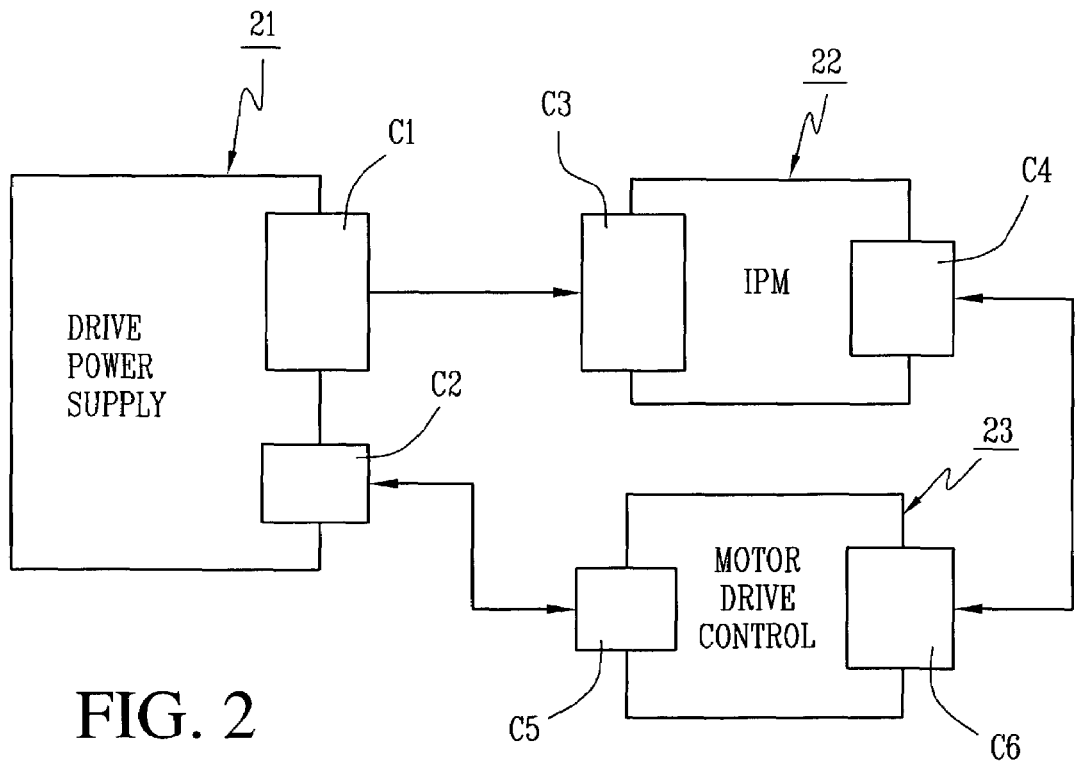
FIG. 2 is a block diagram illustrating an arrangement of basic elements of a drive power supply apparatus in accordance with both the prior art and the present invention.
Figure 4:
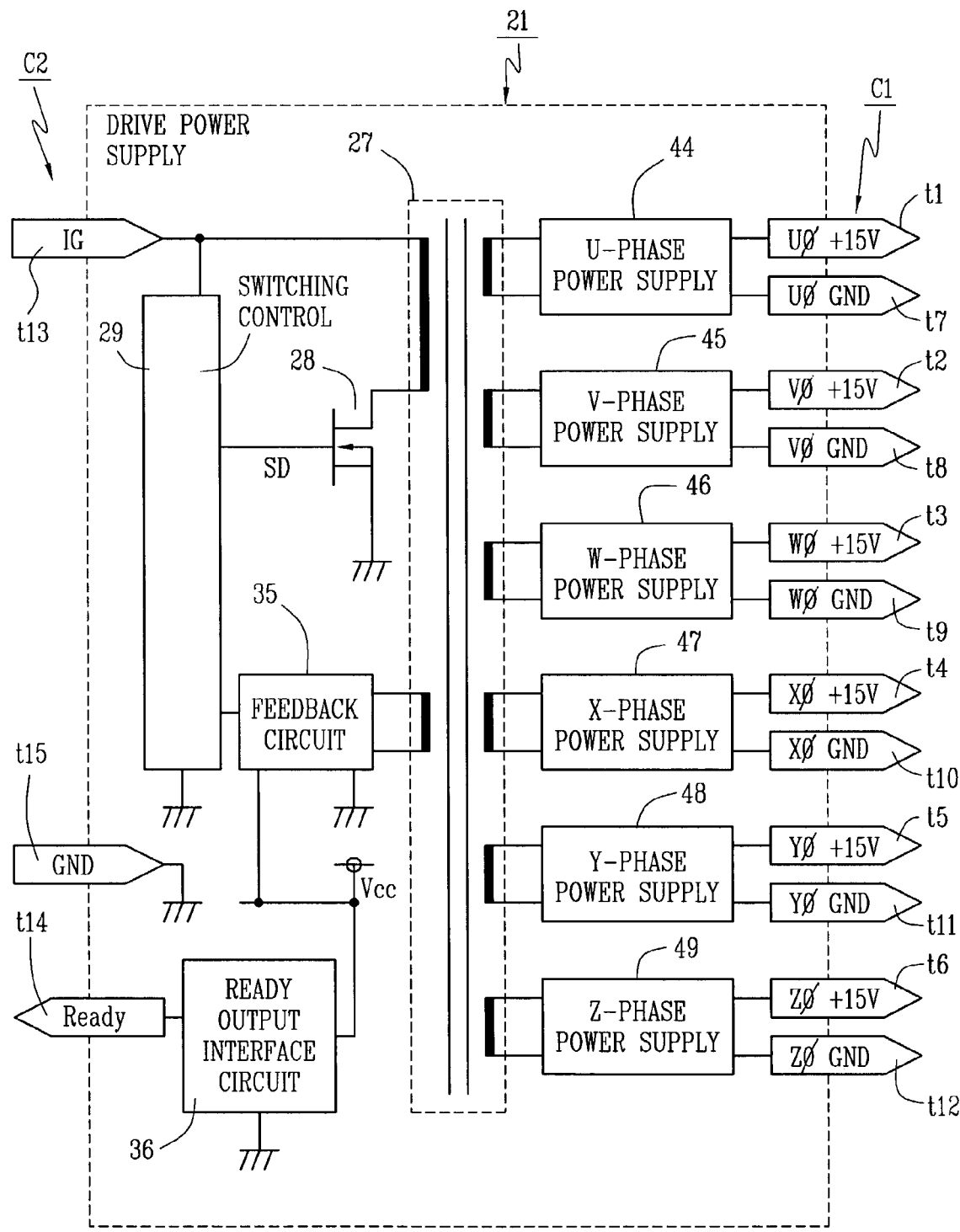
FIG. 4 is a detailed drawing of a drive power supply according to the embodiment of the present invention.

FIG. 1 is a drawing illustrating the main portion of a power supply circuit according to an embodiment of the present invention and FIG. 4 is a detailed drawing of a drive power supply according to the embodiment of the present invention.

In the figures, reference numeral 21 denotes a drive power supply, and connectors C1 and C2 are provided in the drive power supply 21. The connector C1 is equipped with output terminals t1 to t6 for outputting +15 V voltage of the phases U, V, W, X, Y, and Z, and ground (GND) terminals t7 to t12 of each phase. The connector C2 is equipped with an input terminal t13 for receiving battery voltage that is power voltage for auxiliary machines supplied from the motor drive control 23 as ignition (IG) voltage via an ignition switch (not shown), an output terminal t14 for outputting a Ready signal that is a normal operation signal indicating the drive power supply 21 is operating normally, and a ground terminal t15 for grounding the drive power supply 21. The ignition voltage represents a signal with a higher voltage level than the normal Ready signal.

Also, the drive power supply 21 includes a transformer 27 for generating +15 V voltage based upon the ignition voltage; an FET 28, which is a switching element on a primary side of the transformer 27, that intermittently turns a current on and off, and generates a predetermined primary current; a switching control circuit 29 that generates a duty signal SD which is a switching signal, sends the duty signal SD to the FET 28, and switches the FET 28; a phase U power supply circuit 44, a phase V power supply circuit 45, a phase W power supply circuit 46, a phase X power supply circuit 47, a phase Y power supply circuit 48, and a phase Z power supply circuit 49 on a secondary side of the transformer 27 which generate +15 V voltage of each phase in connection with the switching of the FET 28; a feedback circuit 35 provided on the primary side for voltage feedback accompanying the generation of +15 V voltage of each phase on the secondary side; and a Ready output interface (I/F) circuit 36 that generates a Ready signal. The feedback circuit 35 and the Ready output interface circuit 36 are connected via a power supply Vcc. A drive voltage generating portion is structured from the phase U power supply circuit 44, the phase V power supply circuit 45, the phase W power supply circuit 46, the phase X power supply circuit 47, the phase Y power supply circuit 48, and the phase Z power supply circuit 49.

The phase U power supply circuit 44 is connected to the output terminal t1 and the ground terminal t7; the phase V power supply circuit 45 is connected to the output terminal t2 and the ground terminal t7; the phase W power supply circuit 46 is connected to the output terminal t3 and the ground terminal t9; the phase X power supply circuit 47 is connected to the output terminal t4 and the ground terminal t10; the phase Y power supply circuit 48 is connected to the output terminal t5 and the ground terminal t11; and the phase Z power supply circuit 49 is connected to the output terminal t6 and the ground terminal t12. Also, the output terminal t14 is connected to the Ready output interface circuit 36, and the Ready signal is output to the motor drive control 23 via the output terminal t14. A connector C5 is provided in the motor drive control 23, and the connector C5 is equipped with an input terminal t21 in order to receive the Ready signal sent from the drive power supply 21. When the connection is cut off in the input terminal t21, a pull-down resistor R5 is connected to the input terminal t21 in order to render the logic on the inner side a lower level than the input terminal t21.

The feedback circuit 35 is equipped with a capacitor C connected between the power supply Vcc that supplies +5 V control voltage and a ground; a diode D1 connected in parallel and in series with the capacitor C; a primary side coiling m which is a voltage generating portion for feedback; and resistors R1 and R2 for dividing voltage which are connected in parallel and in series with the capacitor C. A switching control circuit 29 is connected between the resistors R1 and R2. A voltage dividing portion 39 is structured from the resistors R1 and R2.

In connection with the generation of +15 V voltage of the phases U, V, W, X, Y, and Z, +5 V control voltage is generated by the primary side coiling m and supplied to the power supply Vcc. Also, the control voltage is supplied to the switching control circuit 29 as voltage for primary feedback, i.e. primary voltage feedback. According to the design of the switching control circuit 29, the control voltage is divided by the voltage dividing portion 39, and +2 V voltage is supplied to the switching control circuit 29 as voltage for secondary feedback, i.e. secondary feedback voltage.

When voltage higher than +15 V is generated on the secondary side of the transformer 27, primary feedback voltage higher than +5 V is generated in the primary side coiling m, the primary feedback voltage is divided by the voltage dividing portion 39, and secondary feedback voltage higher than +2 V is supplied to the switching control circuit 29. When secondary feedback higher than +2 V is supplied, the switching control circuit 29 reduces the duty cycle of the duty signal SD, and lowers the voltage generated on the secondary side of the transformer 27.

When voltage lower than +15 V is generated on the secondary side of the transformer 27, primary feedback voltage lower than +5 V is generated in the primary side coiling m, the primary feedback voltage is divided by the voltage dividing portion 39, and secondary feedback voltage lower than +2 V is supplied to the switching control circuit 29. When secondary feedback lower than +2 V is supplied, the switching control circuit 29 increases the duty cycle of the duty signal SD, and raises the voltage generated on the secondary side of the transformer 27. Thus, it is possible to maintain the voltage generated on the secondary side of the transformer 27 as +15 V.

The Ready output interface circuit 36 is equipped with a transistor Tr11 which is a Ready signal generating portion for generating a Ready signal; a resistor R3 connected between the collector of the transistor Tr11 and the output terminal t14 which reduces the voltage of the output terminal t14 by only a predetermined value; and a diode D2, which is an abnormality detecting portion connected between the collector of the transistor Tr11 and the resistor R3, that generates an IG short which is a signal short circuit from the ignition voltage, and supplies the flowing current to the power supply Vcc from the output terminal t14 via the resistor R3 when the voltage of a predetermined terminal, for example, output terminal t14, fluctuates. The power supply Vcc is connected to an emitter of the transistor Tr11, and a Ready signal generation processing mechanism (not shown) is connected to the base of the transistor Tr11 via a resistor R4.

Next, the operation of the drive power supply 21 will be described.

Figure 5:
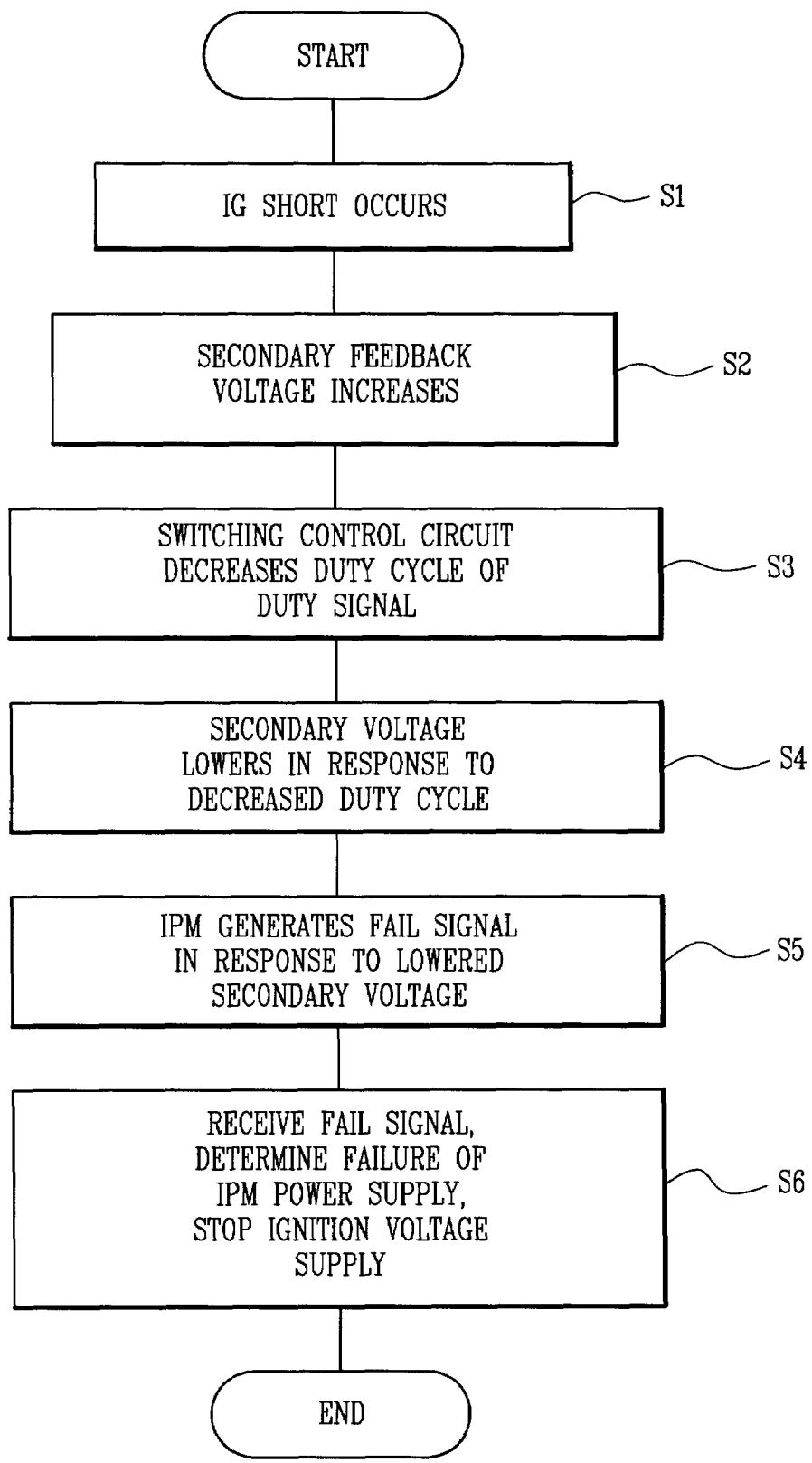
FIG. 5 is a flow chart illustrating the operation of the drive power supply according to the embodiment of the present invention.

FIG. 5 is a flow chart illustrating the operation of a drive power supply according to the embodiment of the present invention.

First, when a driver, i.e. an operator, turns the ignition switch on, ignition voltage from the motor drive control 23 (FIG. 1) is supplied to the drive power supply 21 via the input terminal t21. When the drive power supply 21 is operating normally in connection with the supply of ignition voltage, the Ready signal generation processing mechanism executes a Ready signal generation process to render the Ready signal generation signal sent to the base of the transistor Tr11 a low level. As a result, current flows from the power supply Vcc via the transistor Tr11, and the voltage is marginally lowered by the resistor R3, generating a Ready signal with the standard voltage of approximately +5 V. The Ready signal is then output from the output terminal t14 to the motor drive control 23.

When the input terminal t13 (FIG. 4) and the output terminal t14 short circuit and generate an IG short, the voltage of the output terminal t14 becomes higher than the standard voltage of the Ready signal, current flows to the power supply Vcc from the output terminal t14 via the resistor R3 and the diode D2, and a voltage Vab applied to the power supply Vcc becomes higher than +5 V which is a value Vnr during normal periods. Namely, when an IG short occurs, the diode D2 increases feedback voltage. As a result, since the primary feedback voltage becomes higher than +5 V and the secondary feedback voltage becomes higher than +2 V, the switching control circuit 29 reduces the duty cycle of the duty signal SD (FIG. 4), and lowers the voltage generated on the secondary side of the transformer 27.

The value when the primary feedback voltage becomes high differs according to a circuit constant of the inner portion. In addition, the value Vnr, the minimum value of the ignition voltage, and the like are set such that the voltage Vab applied to the power supply Vcc in connection with the generation of the IG short becomes higher than the value Vnr during normal periods. Namely, if the minimum value of the ignition value is Vig, and the lowered voltage when current flows from the diode D2 is Vd, then $$Vnr < Vig - Vd.$$

Hence, when an IG short occurs, the primary feedback voltage remains higher than approximately +5 V, therefore the duty cycle of the duty signal SD is rendered smaller as time passes, and eventually becomes zero. Also, voltage generated on the secondary side also decreases in connection with the duty cycle decrease. As a result, the voltage output to the motor drive control 23 from the output terminals t1 to t6 becomes lower than +15 V.

A fail signal generating portion (not shown) of the IPM 22 (FIG. 3) generates a fail signal and sends the fail signal to the motor drive control 23 when the voltage supplied from the drive power supply 21 becomes lower than a threshold. When the motor drive control 23 receives the fail signal, a power voltage supply stop algorithm (not shown) in the CPU 24 executes a power voltage supply stop process, performs a fail determination to the effect that power for the IPM failed, and stops the supply of ignition voltage to the drive power supply 21 and the IPM 22.

In the present embodiment, the fail signal generating portion is provided in the IPM 22, however, the fail signal generating portion can also be provided in the drive power supply 21. In this case, the fail signal generating portion reads the duty cycle from the switching control circuit 29, generates a fail signal when the duty cycle becomes lower than a threshold and sends the fail signal to the motor drive control 23.

Thus, when an IG short occurs and the logic of the Ready signal becomes a high level, the secondary feedback voltage in the feedback circuit 35 becomes high, the duty cycle of the duty signal SD is rendered smaller, and the voltage output to the motor drive control 23 is rendered lower than +15 V. As a result, a fail determination that power for the IPM has failed is made in connection with the generation of the fail signal.

Accordingly, even if the logic of the Ready signal becomes a high level, it is possible to reliably determine whether an IG short has occurred and whether an abnormality has been generated in the drive power supply 21 independent of the voltage of the output terminal t14. Also, since it is not necessary to separately provide an IG short detecting circuit, not only can the drive power supply apparatus be simplified, but the cost of the drive power supply apparatus can be reduced as well.

Next, the flow chart will be described.

Step S1: IG short occurs.

Step S2: Secondary feedback voltage increases.

Step S3: Switching control circuit 29 decreases duty cycle of duty signal SD.

Step S4: Secondary side voltage lowers in connection with decrease in duty cycle.

Step S5: IPM 22 generates fail signal in connection with lowered secondary side voltage.

Step S6: Receive fail signal, determine failure of IPM power supply, stop ignition voltage supply, and end process.

The present invention is not limited to the aforementioned embodiment, and various modifications based on the purpose of the present invention are possible, which are regarded as within the scope of the present invention.

The invention claimed is:

1. A drive power supply apparatus comprising:
   a drive power supply having a switching control circuit that switches a switching element on a primary side of a transformer, a drive voltage generating portion that generates a predetermined drive voltage in connection with the switching of the switching element on a secondary side of the transformer and supplies the drive voltage to an intelligent power module (IPM) from a drive voltage output terminal, and a feedback circuit that generates feedback voltage in connection with the generation of drive voltage in the drive voltage generating portion and supplies the feedback voltage to the switching control circuit;
   a predetermined terminal that outputs a normal operation signal that indicates a drive power supply is operating normally to a motor drive control for driving an electric motor; and
   an abnormality detecting portion that changes the feedback voltage when the voltage of the predetermined terminal fluctuates.

2. The drive power supply apparatus according to claim 1, further comprising a ready output interface circuit connected to the predetermined terminal and the feedback circuit, the ready output interface circuit being configured to generate the normal operation signal,
   wherein the abnormality detecting portion increases the feedback voltage when a short is generated by a signal with a higher voltage level than the normal operation signal.

3. The drive power supply apparatus according to claim 1, further comprising a fail signal generating portion that generates a fail signal when a drive voltage changes in connection with a change in the feedback voltage.

4. The drive power supply apparatus according to claim 3, wherein the fail signal generating portion is provided in the IPM.

5. The drive power supply apparatus according to claim 3, further comprising a power voltage supply stop processing mechanism that stops the supply of power voltage to the IPM for driving the electric machine when the fail signal is generated.

6. A fail determination method comprising the steps of:
   switching a switching element on a primary side of a transformer;
   generating a predetermined drive voltage in connection with the switching of the switching element on a secondary side of the transformer and supplying the drive voltage to an intelligent power module (IPM) from a drive voltage output terminal;
   outputting on a predetermined terminal a normal operation signal that indicates a drive power supply is operating normally, to a motor drive control for driving an electric motor;
   generating feedback voltage in connection with the generation of the drive voltage; and
   changing the feedback voltage when the voltage of the predetermined terminal fluctuates in connection with the supply of the feedback voltage to a switching control circuit that switches the switching element on the primary side of the transformer.

7. The drive power supply apparatus according to claim 1, wherein the feedback voltage is lower than the drive voltage.

8. The drive power supply apparatus according to claim 1, wherein the normal operation signal is a voltage signal lower than the feedback voltage.

* * * * *